United States Patent
Kohler

(10) Patent No.: US 7,499,790 B2
(45) Date of Patent: Mar. 3, 2009

(54) METHOD FOR THE PLAUSIBILITY CHECK OF THE SHUT-DOWN TIME OF A MOTOR VEHICLE WITH AN INTERNAL COMBUSTION ENGINE

(75) Inventor: Armin Kohler, Ingolstadt (DE)

(73) Assignee: Audi AG, Ingolstadt (DE)

( * ) Notice: Subject to any disclaimer, the term of this patent is extended or adjusted under 35 U.S.C. 154(b) by 172 days.

(21) Appl. No.: 11/580,068

(22) Filed: Oct. 13, 2006

(65) Prior Publication Data
US 2007/0088470 A1      Apr. 19, 2007

(30) Foreign Application Priority Data
Oct. 14, 2005   (DE) .................. 10 2005 049 120

(51) Int. Cl.
*G06F 19/00* (2006.01)
*F02B 77/08* (2006.01)
(52) U.S. Cl. .................. 701/112; 123/198 D
(58) Field of Classification Search ............ 123/198 D, 123/198 DB, 179.4; 701/101, 102, 112, 182, 701/183; 73/116; 307/10.1, 10.2
See application file for complete search history.

(56) References Cited

U.S. PATENT DOCUMENTS

| | | | | |
|---|---|---|---|---|
| 4,768,480 A | * | 9/1988 | Grenn et al. | 123/198 D |
| 5,072,702 A | * | 12/1991 | Sasaki et al. | 123/179.4 |
| 5,426,934 A | | 6/1995 | Hunt et al. | |
| 6,025,655 A | * | 2/2000 | Hopf | 307/10.2 |
| 6,098,013 A | * | 8/2000 | Mueller | 701/112 |
| 6,785,603 B2 | * | 8/2004 | Inoue | 701/112 |
| 7,275,425 B2 | | 10/2007 | Buck et al. | |

FOREIGN PATENT DOCUMENTS

| | | | |
|---|---|---|---|
| DE | 44 02 850 A1 | 8/1994 | |
| DE | 103 41 454 A1 | 5/2004 | |
| JP | 07054681 A | * 2/1995 | 123/198 D |

\* cited by examiner

*Primary Examiner*—Willis R Wolfe, Jr.
(74) *Attorney, Agent, or Firm*—Novak Druce & Quigg LLP

(57) ABSTRACT

In a method for the plausibility check of the shut-down time of a motor vehicle with an internal combustion engine for a subsequent diagnostic process, it is proposed that after the internal combustion engine is turned on, a first control device for the internal combustion engine of the motor vehicle determines a first shut-down time T1, which is limited to a specified run-on time TN, and a second control device of the motor vehicle determines a second shut-down time T2, whereby the difference ΔT is formed from the first shut-down time T1 and the second shut-down time T2, and the second shut-down time T2 is found to be plausible if the difference ΔT lies within a range that is defined based on the first shut-down time T1 or the run-on time TN. In accordance with the proposal, a simple plausibility check of the second shut-down time T2 is performed and the conditioning of the internal combustion engine can be examined based on this second shut-down time T2, and optionally a diagnostic process can be started.

11 Claims, 4 Drawing Sheets

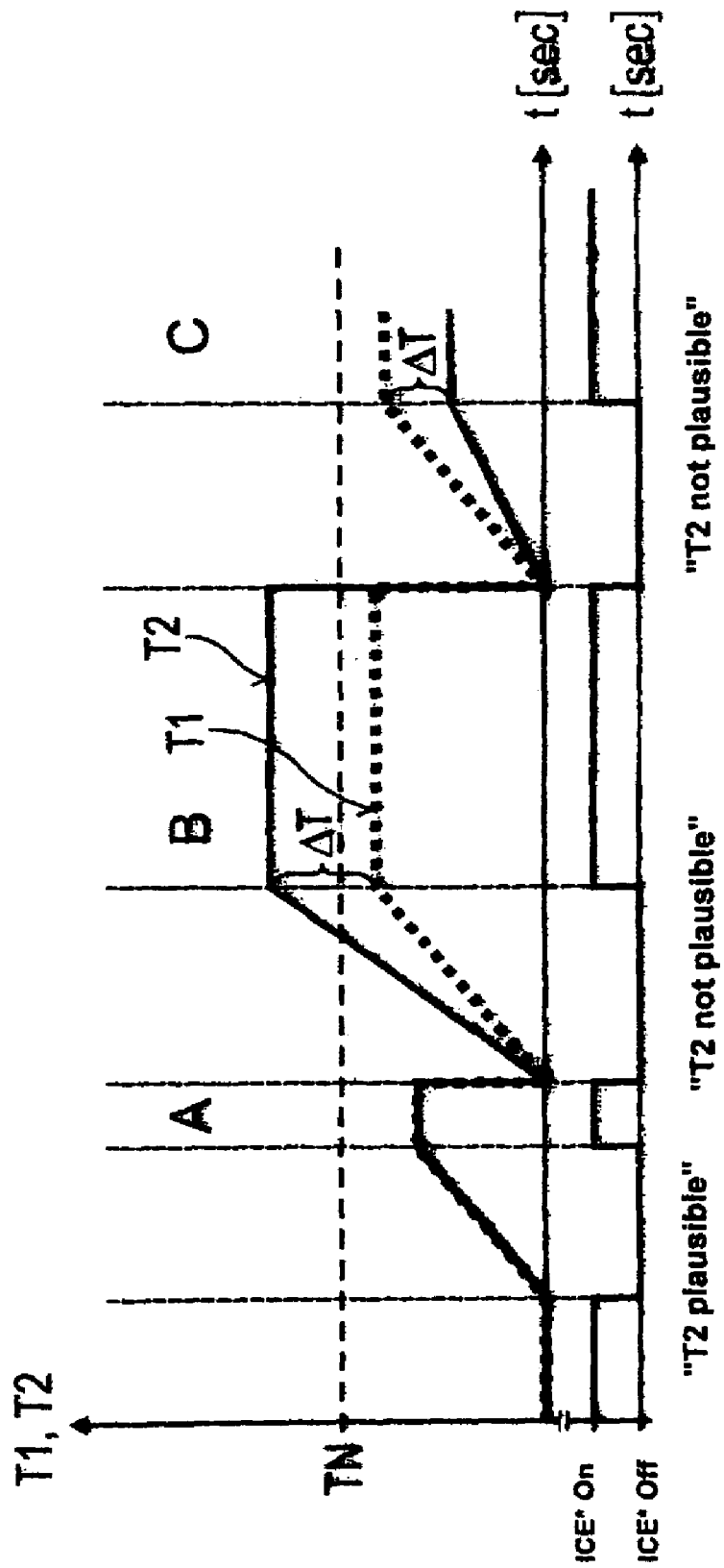

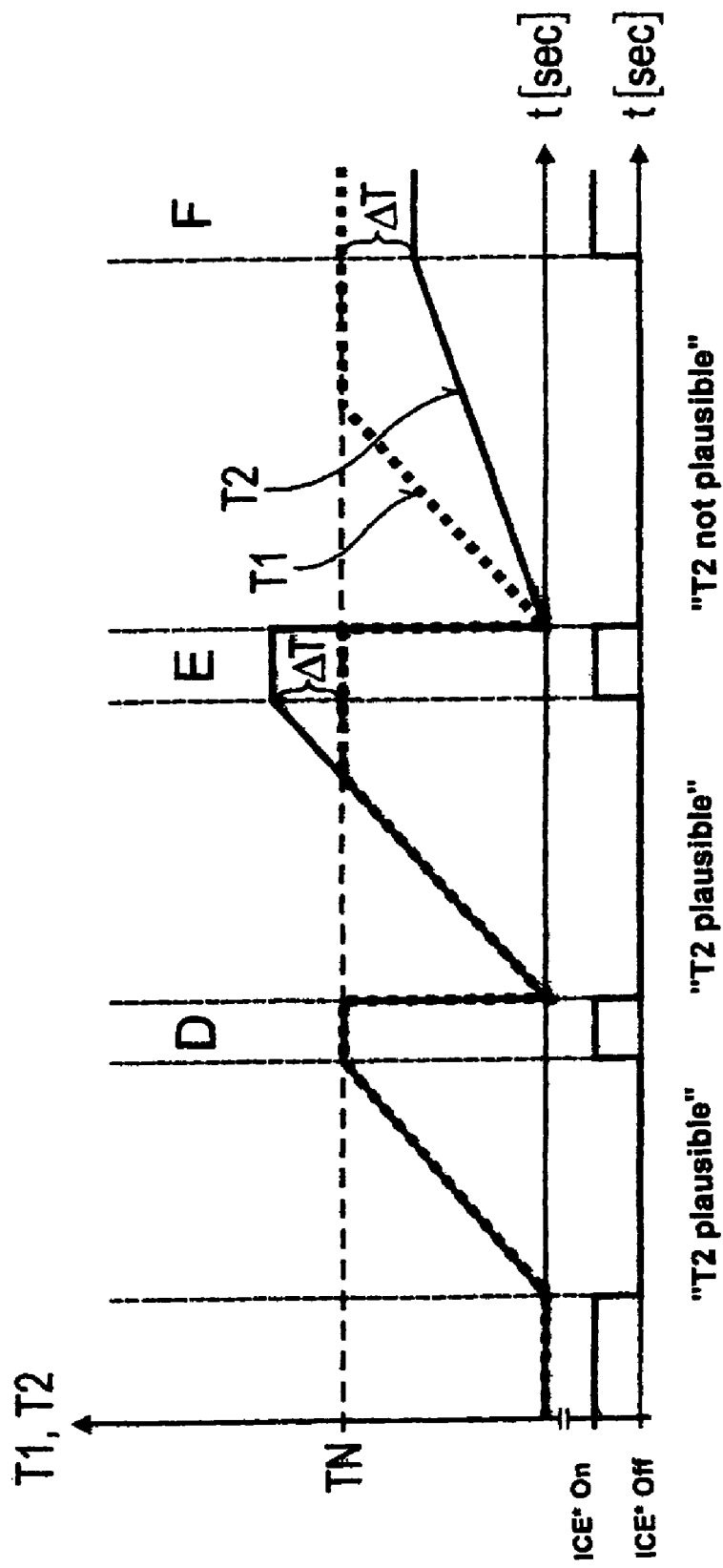

METHOD FOR THE PLAUSIBILITY CHECK OF THE SHUT-DOWN TIME OF A MOTOR VEHICLE WITH AN INTERNAL COMBUSTION ENGINE

This application claims priority from DE 102005049120.0, having been filed Oct. 14, 2005, herein incorporated by reference in its entirety.

This invention relates to a method for the plausibility check of the shut-down time of a motor vehicle with an internal combustion engine for a subsequent diagnostic process.

For certain diagnostic processes, it is necessary that a motor vehicle with an internal combustion engine be in a cold-start situation. Such diagnostic processes are used, for example, to test the tightness of the fuel supply system and the functionality of the temperature sensor of a cooling-water system or to monitor the temperature sensor of the intake air.

The cold-start situation is determined, for example, via temperature sensors that are present in the motor vehicle. The values supplied by the temperature sensors are however valid only to a limited extent, because, in this context, the influences of changing ambient temperatures as well as the effects of various structural space conditions represent a considerable impairment.

Instead of the values supplied by the temperature sensors, in theory a shut-down time of the internal combustion engine that is supplied by the engine control device could also be used for the detection of a conditioning. In this case, however, this presents the problem that the engine control device is also turned off typically shortly after the internal combustion machine is switched off in order to prevent damage to the power supply, so that the shut-down time that is supplied by the engine control device is limited to the run-on time of the engine control device. Irrespective, a thus determined shut-down time should be subjected to a plausibility check so that the subsequent diagnostic process meets the criteria required by the authorities.

Against this background, the object of this invention is a method for the plausibility check of the shut-down time of a motor vehicle with an internal combustion engine, which ensures, on the one hand, that the determined shut-down time is plausible, and, on the other hand, a sufficiently high diagnostic frequency is allowed.

This object is achieved by virtue of the fact that, after the internal combustion engine is turned on again, a first control device for the internal combustion engine of the motor vehicle determines a first shut-down time that is limited to a specified run-on time, and a second control device of the motor vehicle determines a second shut-down time, whereby the, difference is formed from the first shut-down time, and the second shut-down time, and the second shut-down time is found to be plausible if the difference lies within a range that is defined based on the first shut-down time or the run-on time. By a second shut-down time that is determined by a second control device, for example the instrument cluster or a so-called body computer module (BCM), being consulted and the first shut-down time that is determined from the first control device for the internal combustion engine or its specified run-on time being used only as a plausibility criterion, a simple and still reliable assessment of the shut-down time of the motor vehicle with an internal combustion engine is made; this is based on the fact that the running of the second control device is not limited in time and therefore allows the determination of a sufficiently long shut-down time, which can also be above the run-on time of the first control device for the internal combustion machine and which optionally corresponds to a conditioning for a subsequent diagnostic process.

If the first shut-down time is less than the run-on time, then the second shut-down time is found to be plausible if the value of the difference lies within a specified tolerance range.

Also, if the first shut-down time is greater than or equal to the run-on time, then the second shut-down time is found to be plausible if the difference is negative. Thus, the plausibility check of the second shut-down time can be performed in the simplest way.

The tolerance range of the first shut-down time is preferably limited to about 10% of the first shut-down time or to about 20 seconds.

The second shut-down time that is determined from the second control device is suitably formed from the difference between a newly obtained total shut-down time and an old stored overall shut-down time.

Especially preferably, the new total shut-down time begins after a maximum threshold value, again at zero, is reached. This is substantiated by the algorithm of the second control device. In the formation of a negative difference between the new total shut-down time and the old total shut-down time, the threshold value as required is optionally also added thereto.

The difference between the new total shut-down time and the old total shut-down time can be limited to a maximum value, because, above this maximum value, in any case, significant change of the conditioning of the motor vehicle can no longer be found. The new total shut-down time should therefore be stopped before the difference between the new total shut-down time and the old total shut-down time reaches or exceeds the maximum value.

In accordance with further developments, the second shut-down time is set at zero when it is found to be not plausible. This results in that then also no conditioning of the motor vehicle is assumed and no diagnostic routine can be started.

If the second shut-down time, however, is found to be plausible and is sufficiently graduated to condition the motor vehicle, a diagnostic process follows the method for the plausibility check of the shut-down time that is used in particular to determine a malfunction of the temperature sensor of the cooling-water system, the tank evaporation system of the motor vehicle and/or the temperature sensor of the intake air. Then, for the examination of specified temperature or pressure profiles, these processes require certain boundary conditions that correspond to the environmental level and therefore are added only after a sufficient shut-down time of the motor vehicle or the internal combustion engine.

This invention will be explained in more detail with reference to the following figures. Here:

FIG. 2a shows a simplified representation of the comparison between the first shut-down time, determined by a first control device, and the second shut-down time, determined by a second control device, the first shut-down time always being shorter than the run-on time;

Figure 3:
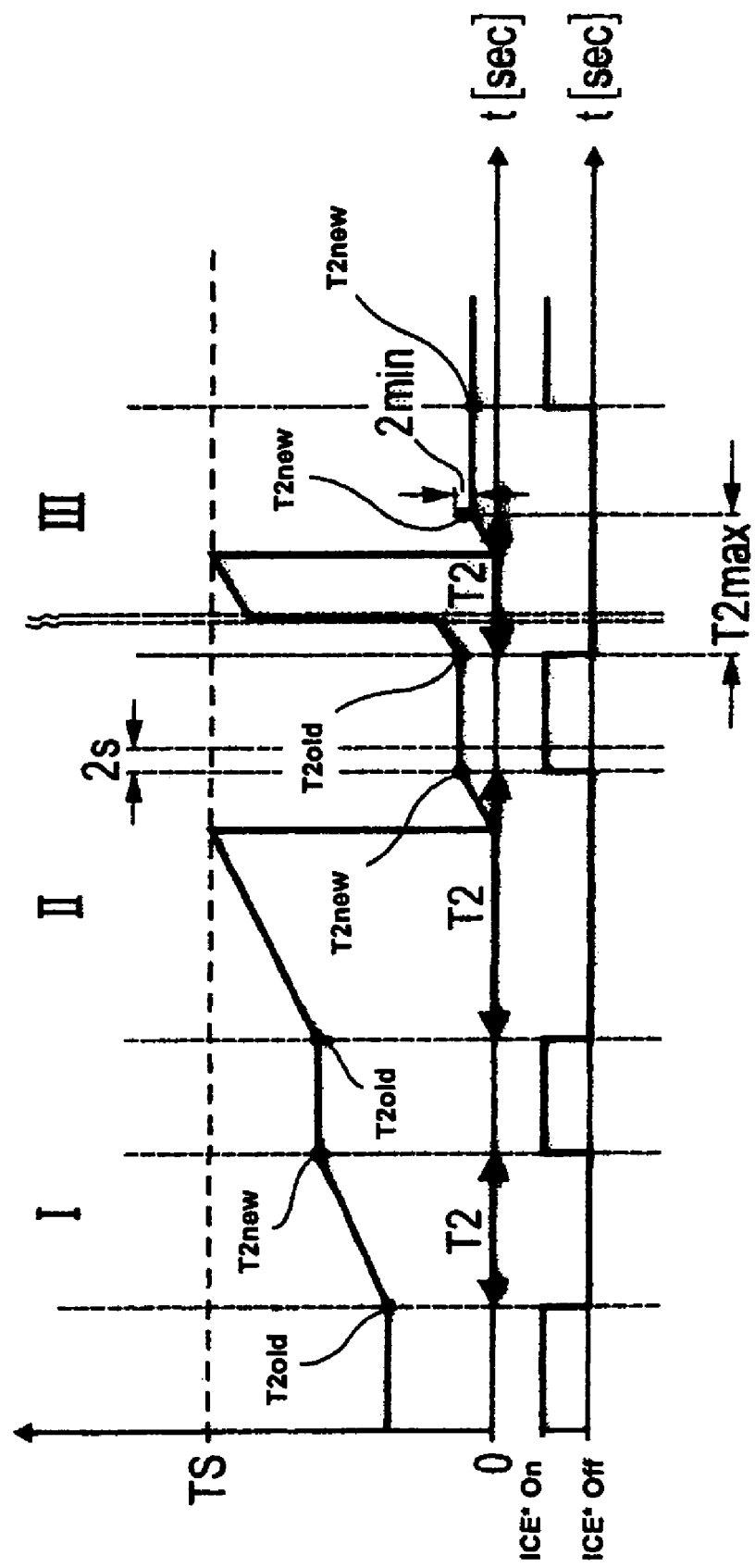

FIG. 2b shows a simplified representation of the comparison between the first shut-down time and the second shut-down time, the first shut-down time being greater than or equal to the run-on time; and FIG. 3 shows a diagrammatic representation of the algorithm for the determination of the second shut-down time, determined from the second control device, in various operational situations of the motor vehicle.

It must be ensured that the motor vehicle with an internal combustion engine first is in a cold-start situation that is suitable for this purpose or in a comparably conditioned state, so that specific diagnostic routines can run when starting up. Only then can a reliable diagnostic routine be performed.

Figure 1:
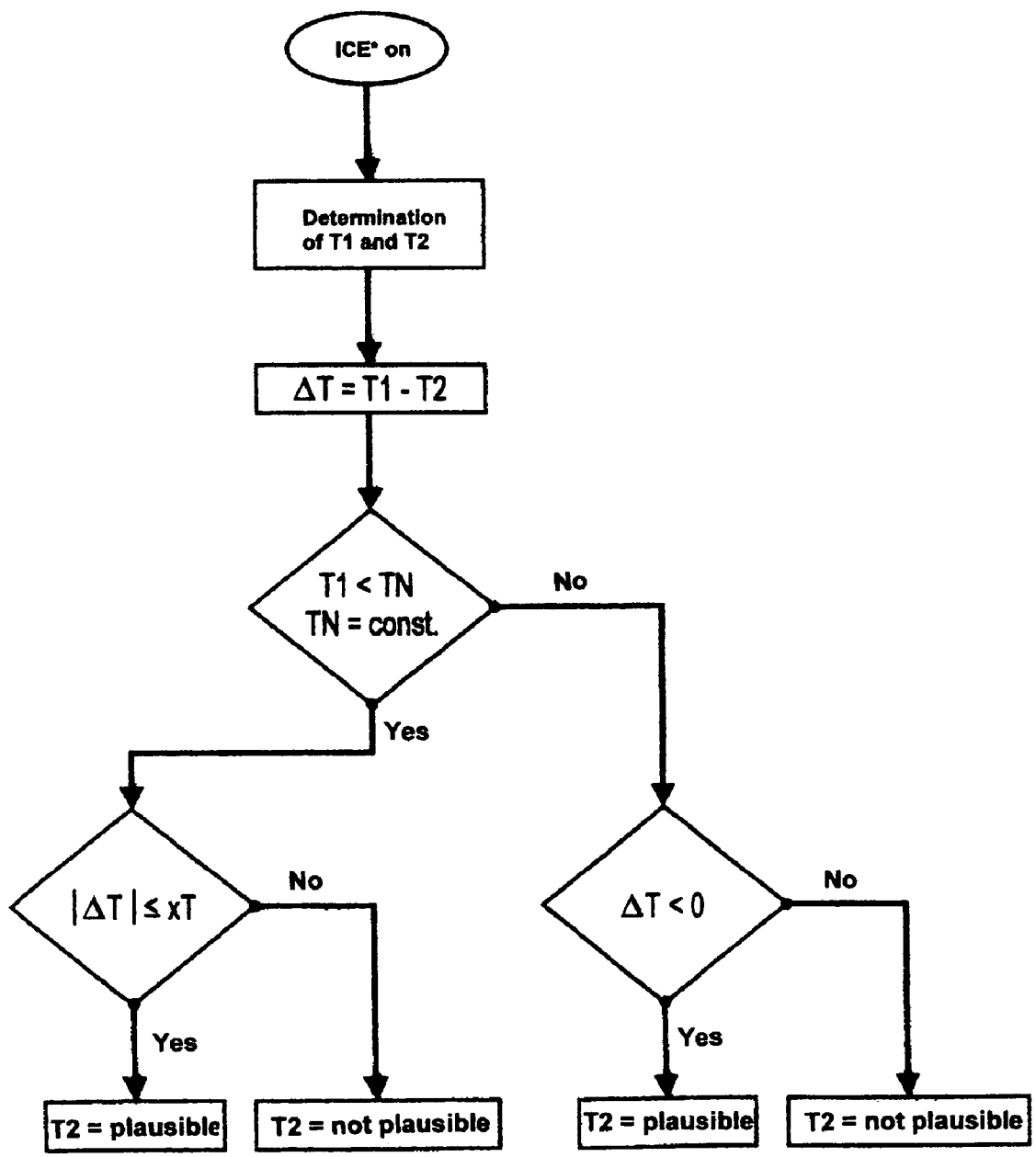
FIG. 1 shows a flow chart of the method claimed for the invention.

According to the flow chart of FIG. 1, the plausibility check process starts with turning on the internal combustion engine "ICE (internal combustion engine) on" again. In this case, first the first shut-down time T1 of the first control device and the second shut-down time T2 of the second control device are detected. Moreover, the difference ΔT=T1-T2 is formed from the first shut-down time T1 and the second shut-down time T2.

Then, it is determined whether the new start of the internal combustion engine takes place during or after the constantly specified run-on time TN of the first control device. Below the run-on time TN, the first shut-down time T1 is less than the run-on time TN, and above the run-on time TN, the first shut-down time T1 is stopped and is therefore equal to the value of the run-on time TN.

The run-on time TN is 900 seconds in this example, so that after the internal combustion engine is switched off, only a low energy consumption is necessary and the battery of the motor vehicle is conserved.

If the first shut-down time T1 thus is shorter than the run-on time TN, it is examined in the next process step whether the amount of the difference ΔT is less than a specified tolerance range xT. This tolerance range xT is specified by, for example, 10% of the first shut-down time T1 or else by a maximum allowable deviation of about 20 seconds. If this tolerance range xT is maintained, the determined second shut-down time T2 is plausible, while if the tolerance range xT is not maintained, the determined second shut-down time T2 is found to be not plausible.

If the first shut-down time T1 is the same as the run-on time TN, however, it is examined in the following process step whether the difference ΔT=T1-T2 is negative. Then, in the event that the difference ΔT is negative, the second shut-down time T2 is found to be plausible, while if the difference ΔT is positive, the second shut-down time T2 is not plausible.

If the plausibility check thus turns out to be positive, it can be examined, following this process, whether the second shut-down time T2 is sufficient for a conditioning of the motor vehicle, and then optionally a diagnostic process is started for examining the temperature sensor of the cooling-water system and the tightness of the tank evaporation system and/or the function test of the temperature sensor of the intake system.

If the plausibility check turns out to be negative, however, the second shut-down time is set at zero. Accordingly, then, no conditioning of the motor vehicle is assumed and also no diagnostic process is triggered.

The diagram of FIG. 2a shows respectively three Examples A, B, and C of the plausibility check for the case that the first shut-down time T1 is less than the run-on time TN. In addition, the ON/OFF state of the internal combustion engine is depicted in this diagram.

Example A in FIG. 2a shows that the two shut-down times T1 and T2 in each case are below the run-on time TN and correspond to one another, such that the difference ΔT tending toward zero that is obtained from the comparison of the two shut-down times T1 and T2 is within the defined tolerance range, and thus a plausible second shut-down time T2 exists.

Example B in FIG. 2a shows that the first shut-down time T1 still lies below the run-on time TN, while the second shut-down time T2 is considerably greater and even lies above the run-on time TN. This means that the amount of the difference ΔT that is obtained is too large and no longer lies within the defined tolerance range. The second shut-down time T2 in Example B therefore is not plausible.

Also, Example C in FIG. 2a shows that the first shut-down time T1 is below the run-on time TN and the second shut-down time T2 is still lower and lies clearly below the first shut-down time T1. Consequently, the difference ΔT is also too large in Example C and lies outside the specified tolerance range, such that the second shut-down time T2 in turn is acknowledged to be not plausible.

Also, for the case that the run-on time TN was reached during the new start-up of the internal combustion engine, the diagrams from FIG. 2b show three additional Examples D, E, and F of the plausibility check. In addition, the ON/OFF state of the internal combustion engine is also depicted in this diagram.

In Example D, the first shut-down time T1 is equal to the run-on time TN, and the second shut-down time T2 is also equal to the first shut-down time T1 or is equal to the run-on time TN. Accordingly, the difference ΔT that is obtained is equal to zero, i.e., is not negative, so that the second shut-down time T2 is acknowledged to be plausible.

Example E shows that the first shut-down time T1 was stopped when the run-on time TN was achieved and that the second shut-down time T2 lies clearly above the first shut-down time T1 or above the run-on time TN. In this case, the second shut-down time T2 is still acknowledged to be plausible since the criterion that the difference ΔT=T1-T2 is negative or the second shut-down time T2 is greater then the first shut-down time T1 or the run-on time TN is met.

Finally, even in the last Example F, a first shut-down time T1 is also depicted that was stopped when the run-on time TN was achieved, while the second shut-down time T2 lies clearly below the first shut-down time T1 or clearly below the run-on time TN, such that the detected second shut-down time T2 does not meet the plausibility criterion and therefore is found to be not plausible.

Based on three new starts of the internal combustion engine I, II, III, FIG. 3 explains the algorithm for determining the second shut-down time T2 by the second control device as the difference between a newly-obtained total shut-down time T2new and a stored, old total shut-down time T2old. This is illustrated by the old total shut-down time T2old or the new total shut-down time T2new and the ON/OFF state of the internal combustion engine being applied in each case via a time axis t.

During a first new start I, it can be observed that the old total shut-down time T2old increases during the OFF state of the internal combustion engine to a new total shut-down time T2new, without the new total shut-down time T2new in this case achieving the threshold value TS of about 36 hours. Corresponding to this, the difference between the new total shut-down time T2new and the old total shut-down time T2old is positive and represents the second shut-down time T2.

During a second new start II, the new total shut-down time T2new further increases during the OFF state of the internal combustion engine, the threshold value TS of about 36 hours is reached and then goes beyond it to a certain extent, begins again at zero and increases to a new total shut-down time T2new, which, however, lies below the old total shut-down time T2old, such that for the formation of the difference between the new total shut-down time T2new and the old total shut-down time T2old, the threshold value TS must be added thereto to obtain a positive second shut-down time T2.

During the third and last new start III, the new total shut-down time T2new increases above the threshold value TS, and the difference between the new total shut-down time T2new and the old total shut-down time T2old also increases above the maximum value T2max, with the maximum difference T2max lying slightly below the threshold value TS. Accordingly, the new total shut-down time T2new is stopped for about 2 minutes, i.e., directly before exceeding the maximum difference T2max, such that the second shut-down time T2 that is obtained from the new total shut-down time T2new and the old total shut-down time T2old plus the threshold value TS is limited to the maximum difference T2max.

In the case of another new start of the internal combustion engine and an operation of the internal combustion engine for some few seconds, the new total shut-down time T2new can again continue, and a new plausibility check can follow.

The invention claimed is:

1. A method for the plausibility check of the shut-down time of a motor vehicle comprising:
    measuring a first shut down time (T1) of an internal combustion engine of the motor vehicle;
    measuring a second shut down time (T2) of the internal combustion engine;
    calculating a $\Delta T$ as T1-T2;
    comparing T1 and T2 to a predetermined tolerance range (xT) and a run-on time (TN);
    finding plausibility if:
        T1<TN and $-xT \leq \Delta T \leq xT$; or
        $TN \leq T1$ and $\Delta T<0$.

2. A method for the plausibility check of the shut-down time of a motor vehicle with an internal combustion engine for a subsequent diagnostic process wherein, after the internal combustion engine is turned on, a first control device for the internal combustion engine of the motor vehicle determines a first shut-down time (T1), which is limited to a specified run-on time (TN), and a second control device of the motor vehicle determines a second shut-down time (T2), whereby the difference ($\Delta T$) is formed from the first shut-down time (T1) and the second shut-down time (T2), and the second shut-down time (T2) is found to be plausible if the difference ($\Delta T$) lies within a range that is defined based on the first shut-down time (T1) or the run-on time (TN).

3. The method according to claim 2, where when the first shut-down time (T1) is greater than or equal to the run-on time (TN), the second shut-down time is found to be plausible if the difference ($\Delta T$) is negative.

4. The method according to claim 2, wherein if the second shut-down time (T2) is found to be "plausible" and is sufficiently graduated for a conditioning, a diagnostic process follows that determines a malfunction of the temperature sensor of the cooling-water system, a malfunction of the tank evaporation system of the motor vehicle and/or a malfunction of the temperature sensors of the intake air.

5. The method according to claim 2, wherein when the first shut-down time (T1) is less than the run-on time (TN), the second shut-down time (T2) is found to be plausible if the amount of the difference ($\Delta T$) lies within a specified tolerance range (xT).

6. The method according to claim 5, wherein the tolerance range (xT) is about 10% of the first shut-down time (T1) or about 20 seconds.

7. The method according to claim 2, wherein the second shut-down time (T2) that is determined from the second control device is formed from the difference between a newly obtained total shut-down time (T2new) and an old, stored total shut-down time (T2old).

8. The method according to claim 7, wherein the new total shut-down time (T2new) begins again at zero after reaching a threshold value (TS).

9. The method according to claim 7, wherein the difference between the new total shut-down time (T2new) and the old total shut-down time (T2old) is limited to a maximum value (T2max).

10. The method according to claim 7, wherein the new total shut-down time (T2new) is stopped before the difference between the new total shut-down time (T2new) and the old total shut-down time (T2old) reaches the maximum value (T2max).

11. The method according claim 7, wherein the second shut-down time (T2) is set at zero when the assessment is "not plausible."

* * * * *